(12) United States Patent
Fujita et al.

(10) Patent No.: US 10,690,872 B2
(45) Date of Patent: Jun. 23, 2020

(54) OPTICAL FIBER PROTECTION STRUCTURE AND OPTICAL COMBINER STRUCTURE USING THE SAME

(71) Applicant: FUJIKURA LTD., Tokyo (JP)

(72) Inventors: Tomoyuki Fujita, Sakura (JP); Hiroto Nakazato, Sakura (JP); Takanori Yamauchi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/090,375

(22) PCT Filed: Apr. 6, 2017

(86) PCT No.: PCT/JP2017/014389
§ 371 (c)(1),
(2) Date: Oct. 1, 2018

(87) PCT Pub. No.: WO2017/179487
PCT Pub. Date: Oct. 19, 2017

(65) Prior Publication Data
US 2019/0113702 A1    Apr. 18, 2019

(30) Foreign Application Priority Data

Apr. 15, 2016 (JP) ................................. 2016-081653

(51) Int. Cl.
*G02B 6/44* (2006.01)
*G02B 6/46* (2006.01)
(Continued)

(52) U.S. Cl.
CPC ........... *G02B 6/4432* (2013.01); *G02B 6/255* (2013.01); *G02B 6/2551* (2013.01);
(Continued)

(58) Field of Classification Search
CPC ................................. G02B 6/46; G02B 6/2558
See application file for complete search history.

(56) References Cited

U.S. PATENT DOCUMENTS 4,129,932 A     12/1978  Stancati
5,694,509 A *   12/1997  Uemura ............... G02B 6/2835
                                                385/43

FOREIGN PATENT DOCUMENTS

CN    204832573 U    12/2015
JP    4-313709 A     11/1992
(Continued)

OTHER PUBLICATIONS

International Search Report dated Jul. 4, 2017, issued in counterpart application No. PCT/JP2017/014389 (2 pages).
(Continued)

*Primary Examiner* — Omar R Rojas
(74) *Attorney, Agent, or Firm* — Westerman, Hattori, Daniels & Adrian, LLP

(57) ABSTRACT

An optical fiber protection structure has a fiber accommodation portion having a fiber accommodation groove formed therein for accommodating at least a portion of optical fibers and first resins filled in the fiber accommodation groove. The first resins are to fix a portion of the optical fibers within the fiber accommodation groove. The optical fiber protection structure has a cover member disposed above the fiber accommodation portion so as to cover the fiber accommodation groove, second resins for allowing the first resins to expand toward the cover member to reduce a stress applied to the optical fibers, and a third resin for fixing the cover member onto the fiber accommodation portion. The second resins have a Young's modulus lower than those of the first resins.

16 Claims, 19 Drawing Sheets

SECTION D-D

(51) Int. Cl.
*G02B 6/255* (2006.01)
*G02B 6/26* (2006.01)

(52) U.S. Cl.
CPC ............ *G02B 6/2558* (2013.01); *G02B 6/26* (2013.01); *G02B 6/46* (2013.01)

(56) References Cited

FOREIGN PATENT DOCUMENTS

| JP | 5-19137 A | 1/1993 |
| JP | 7-35946 A | 2/1995 |
| JP | 7-198982 A | 8/1995 |
| JP | 2003-167155 A | 6/2003 |
| JP | 4776420 B2 | 9/2011 |

OTHER PUBLICATIONS

Extended European Search Report dated Nov. 12, 2019, issued counterpart EP Application No. 17782303.6. (15 pages).

\* cited by examiner

PRIOR ART

PRIOR ART

SECTION B-B

SECTION D-D

SECTION F-F

OPTICAL FIBER PROTECTION STRUCTURE AND OPTICAL COMBINER STRUCTURE USING THE SAME

TECHNICAL FIELD

The present invention relates to an optical fiber protection structure, and more particularly to an optical fiber protection structure that accommodates at least a portion of an optical fiber therein.

BACKGROUND ART

In many cases, optical fibers are connected to each other by removing coverings of the optical fibers and fusion-splicing bare fibers of the optical fibers to each other. Such portions of the optical fibers where the coverings have been removed are vulnerable to external forces and may be broken when any impact or vibration is exerted to the optical fibers. Therefore, portions of the optical fibers where the coverings have been removed, such as a fusion splice portion, are received within a fiber accommodation portion having a high tensile strength and fixed by a resin or the like.

Furthermore, in a case of a polymer cladding fiber, an air cladding confines light at portions where a covering has been removed. If a foreign material is attached to the portions where the covering has been removed, then light in the optical fiber may leak into the attached foreign material. In a case of high-power light, the optical fiber may be burnt out. Therefore, there has been known an optical fiber protection structure in which a cover member is disposed above the aforementioned fiber accommodation portion to prevent any foreign material from being attached to a portion where the covering has been removed (see, e.g., Patent Literature 1).

FIG. 1 is a front view schematically showing such a conventional optical fiber protection structure 800, FIG. 2 is a cross-sectional view taken along line A-A of FIG. 1, and FIG. 3 is a cross-sectional view taken along line B-B of FIG. 2. As shown in FIGS. 1 and 2, the conventional optical fiber protection structure 800 has a fiber accommodation portion 820, in which a groove 810 is formed, and a cover member 830 disposed on the fiber accommodation portion 820. As shown in FIGS. 2 and 3, portions of two optical fibers 840 and 840 where the coverings have been removed and a fusion splice portion 860 are received in the groove 810 of the optical fiber protection structure 800. The optical fibers 840 and 840 are fixed to the fiber accommodation portion 820 at both ends of the groove 810 by resins 870. The cover member 830 is fixed onto the fiber accommodation portion 820. Each of the fiber accommodation portion 820 and the cover member 830 is formed of a material having a high tensile strength.

In such a conventional optical fiber protection structure 800, the rigid cover member 830 is placed on the resins 870 for fixing the optical fibers 840. Therefore, if the resins 870 expand under a high-temperature environment or a high-humidity environment, then the expansion of the resins 870 is inhibited by the cover member 830 placed on the resins 870. As a result, as indicated by arrows in FIG. 3, stresses are applied to the optical fibers 840 so that the optical fibers 840 are compressed. Thus, light propagating through the optical fibers 840 tends to be coupled to a higher mode so as to leak out of the optical fibers 840, so that the optical loss increases. For example, when high-power light from a fiber laser propagates through the optical fibers 840, such optical loss may increase the temperature of the optical fibers 840 and the optical fiber protection structure 800.

PRIOR ART LITERATURE

Patent Literature

Patent Literature 1: JP 4776420 B

SUMMARY OF THE INVENTION

Problem(s) to be Solved by the Invention

The Present Invention has been Made in View of the Above Drawbacks. It is, therefore, a first object of the present invention, to provide an optical fiber protection structure capable of suppressing an increase of optical loss of an optical fiber under a high-temperature environment or a high-humidity environment.

Furthermore, a second object of the present invention is to provide an optical combiner structure that is unlikely to cause optical loss even under a high-temperature environment or a high-humidity environment.

Means for Solving Problem(s)

According to a first aspect of the present invention, there is provided an optical fiber protection structure capable of suppressing an increase of optical loss of an optical fiber under a high-temperature environment or a high-humidity environment. This optical fiber protection structure has a fiber accommodation portion having a fiber accommodation groove formed therein for accommodating at least a portion of at least one optical fiber and a first resin filled in the fiber accommodation groove. The first resin is to fix the at least a portion of the at least one optical fiber within the fiber accommodation groove. The optical fiber protection structure has a cover member disposed above the fiber accommodation portion so as to cover at least a portion of the fiber accommodation groove, a fixation portion for fixing the cover member above the fiber accommodation portion, and a first stress reduction portion for allowing the first resin to expand toward the cover member to reduce a stress applied to the at least one optical fiber.

With this configuration, even if the first resin for fixing at least a portion of the optical fiber within the fiber accommodation groove expands under a high-temperature environment or a high-humidity environment, the first stress reduction portion allows the first resin to expand toward the cover member. Thus, a stress applied to the optical fiber by the first resin is reduced. Therefore, an increase of optical loss of the optical fiber due to a stress applied to the optical fiber can effectively be suppressed.

The first stress reduction portion may be formed by a second resin formed between the first resin and the cover member which has a Young's modulus lower than that of the first resin. Alternatively, the first stress reduction portion may be formed by a gap defined between the first resin and the cover member.

The fixation portion may be formed by a third resin formed between an upper surface of the fiber accommodation portion and the cover member. In this case, the third resin may preferably have a Young's modulus higher than that of the second resin. When the cover member is fixed onto the fiber accommodation portion by the third resin having a Young's modulus higher than the second resin, a stress applied to the optical fiber can be reduced by the second resin having a lower Young's modulus (more likely to deform) while the cover member can firmly be fixed onto the fiber accommodation portion by the third resin having a higher Young's modulus (less likely to deform).

Furthermore, the first stress reduction portion and the fixation portion may be formed by a second resin formed between the first resin and the cover member and between an upper surface of the fiber accommodation portion and the cover member. The second resin may have a Young's modulus lower than that of the first resin. With this configuration, the stress reduction portion and the fixation portion can be implemented by the same resin. Therefore, the manufacturing process can be simplified, and the manufacturing cost can also be reduced.

The optical fiber protection structure may also have a fourth resin provided within the fiber accommodation groove so as to cover at least a portion of the at least one optical fiber within the fiber accommodation groove and a second stress reduction portion for allowing the fourth resin to expand toward the cover member to reduce a stress applied to the at least one optical fiber. In this case, the fourth resin may be formed of a material having a refractive index lower than that of a cladding of the optical fiber. With this configuration, light propagating through the bare fiber exposure portion is prevented from leaking out of the bare fiber exposure portion. Alternatively, the fourth resin may be formed of a material having a refractive index higher than that of a cladding of the optical fiber. In this case, unnecessary light propagating through the cladding of the optical fiber can be removed while the influence of heat generated by such unnecessary light on the optical fiber can be reduced.

The second stress reduction portion may be formed by a fifth resin formed between the fourth resin and the cover member. The fifth resin may have a Young's modulus lower than that of the fourth resin. Alternatively, the second stress reduction portion may be formed by a gap defined between the fourth resin and the cover member. With this configuration, since the fourth resin is allowed to expand toward the cover member, a stress applied to the optical fiber is reduced.

According to a second aspect of the present invention, there is provided an optical combiner structure that is unlikely to cause optical loss even under a high-temperature environment or a high-humidity environment. This optical combiner structure includes the optical fiber protection structure as described above and an optical combiner including a first optical fiber, a second optical fiber, and a fusion splice portion in which the first optical fiber and the second optical fiber are connected to each other by fusion splicing. At least a portion of the first optical fiber, at least a portion of the second optical fiber, and the fusion splice portion are accommodated within the fiber accommodation groove of the fiber accommodation portion in the optical fiber protection structure.

Advantageous Effects of the Invention

According to the present invention, even if a first resin for fixing at least a portion of an optical fiber within a fiber accommodation groove expands under a high-temperature environment or a high-humidity environment, a first stress reduction portion allows the first resin to expand toward a cover member. Thus, a stress applied to the optical fiber by the first resin is reduced. Therefore, an increase of optical loss of the optical fiber due to a stress applied to the optical fiber can effectively be suppressed.

MODE(S) FOR CARRYING OUT THE INVENTION

Figure 1:
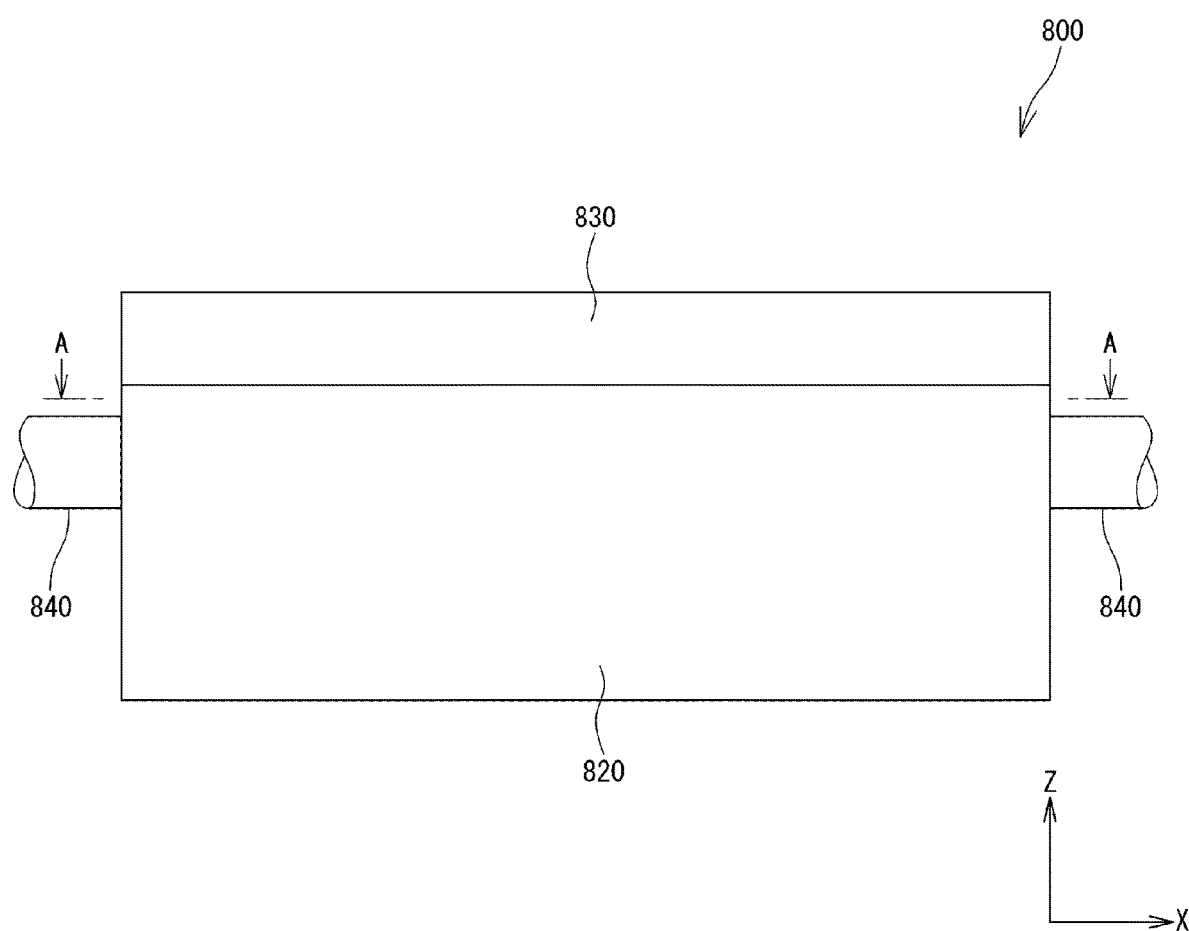
FIG. 1 is a front view schematically showing a conventional optical fiber protection structure.
Figure 2:
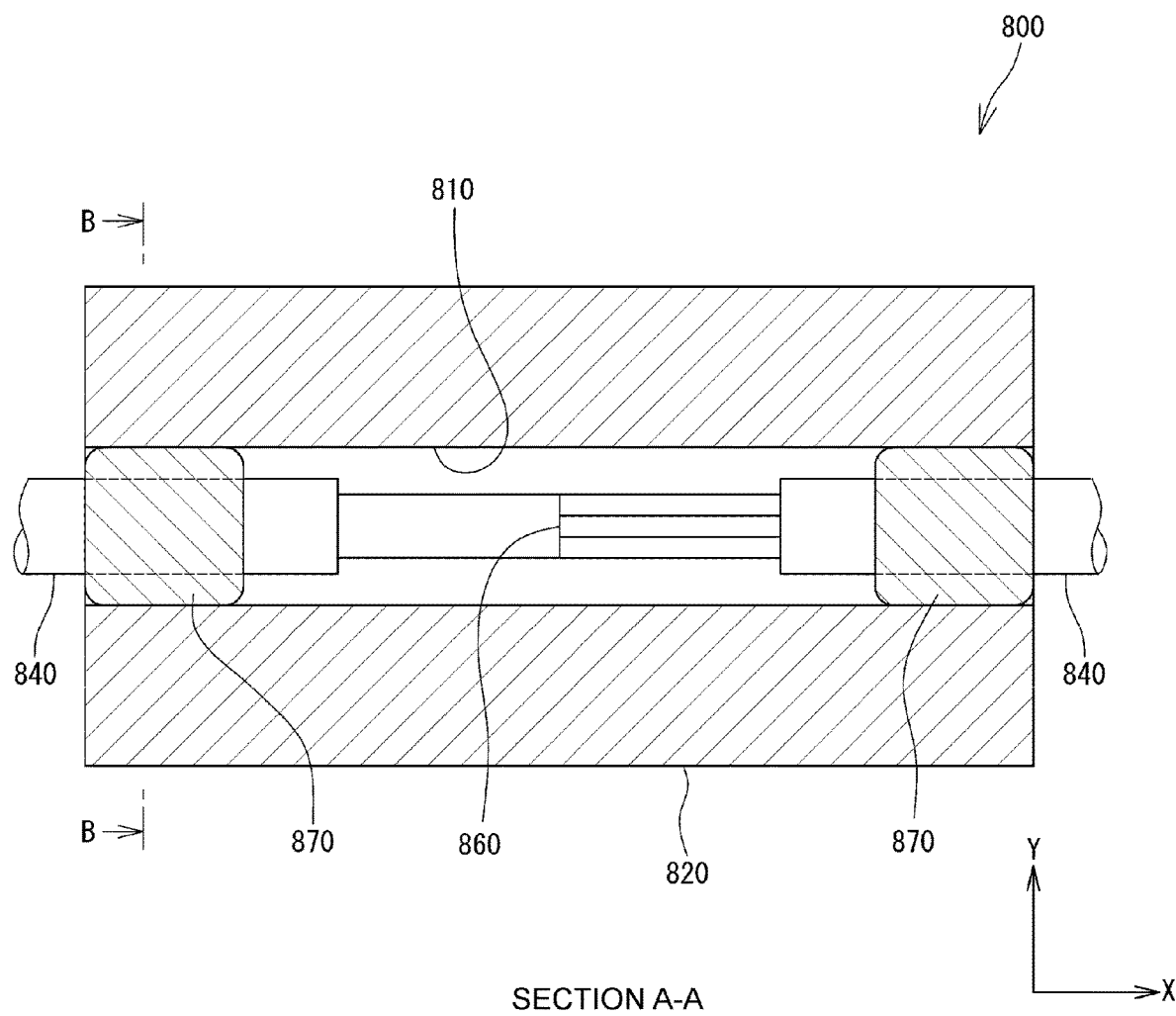
FIG. 2 is a cross-sectional view taken along line A-A of FIG. 1.
Figure 3:
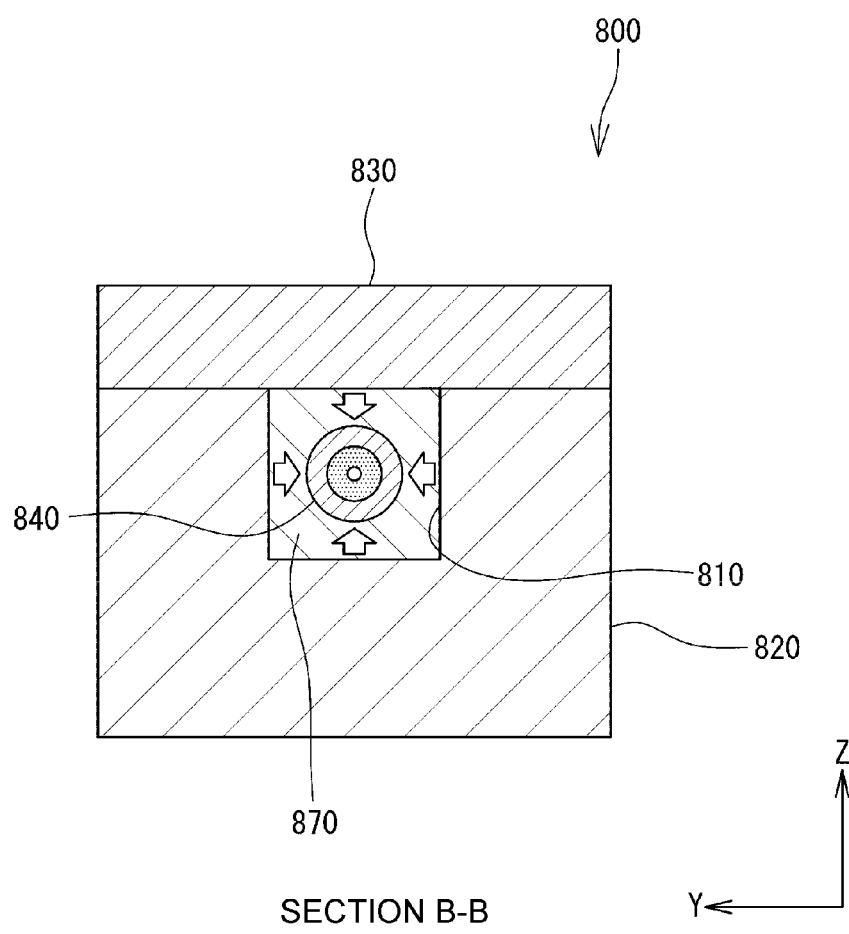
FIG. 3 is a cross-sectional view taken along line B-B of FIG. 2.

Embodiments of an optical fiber protection structure and an optical combiner structure using such an optical fiber protection structure according to the present invention will be described in detail below with reference to FIGS. 4 to 19. In FIGS. 4 to 19, the same or corresponding components are denoted by the same or corresponding reference numerals and will not be described below repetitively. Furthermore, in FIGS. 4 to 19, the scales or dimensions of components may be exaggerated, or some components may be omitted.

Figure 4:
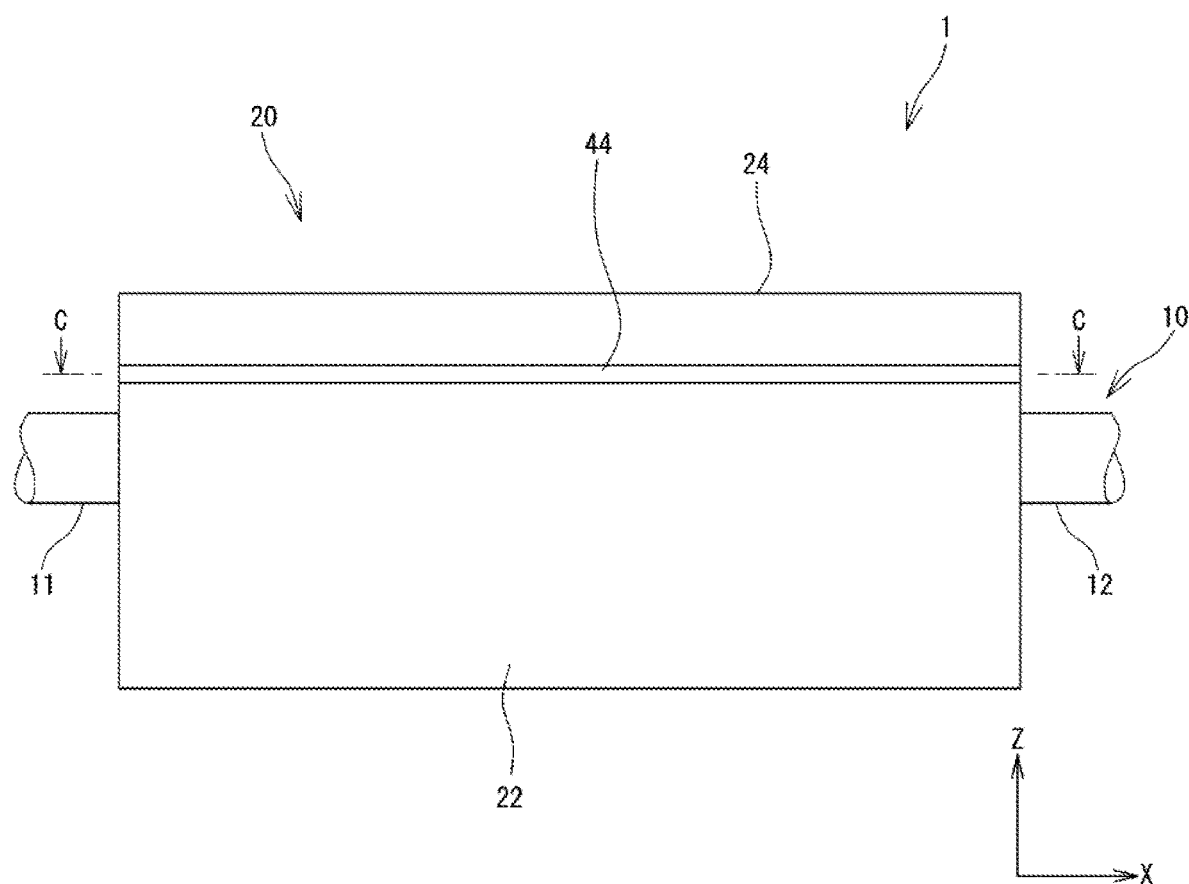
FIG. 4 is a front view showing an optical combiner structure according to a first embodiment of the present invention.
Figure 5:
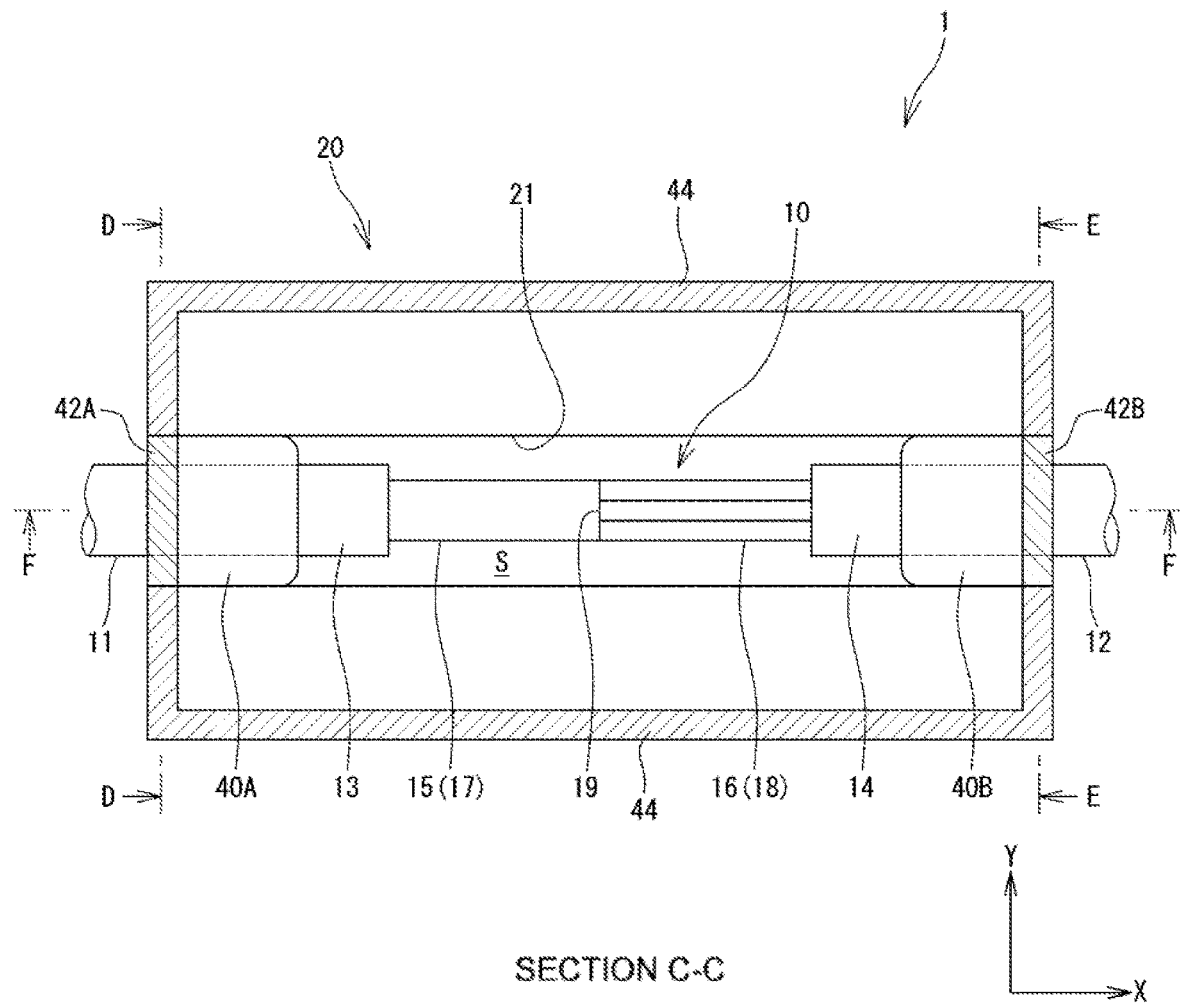
FIG. 5 is a cross-sectional view taken along line C-C of FIG. 4.

FIG. 4 is a front view showing an optical combiner structure 1 according to a first embodiment of the present invention, and FIG. 5 is a cross-sectional view taken along line C-C of FIG. 4. As shown in FIGS. 4 and 5, the optical combiner structure 1 includes an optical combiner 10 having optical fibers 11 and 12 connected to each other by fusion splicing and an optical fiber protection structure 20 that protects a fusion splice portion 19 between the optical fibers 11 and 12. The optical combiner 10 has a first optical fiber 11, a second optical fiber 12, and a fusion splice portion 19 at which the first optical fiber 11 and the second optical fiber 12 are connected to each other by fusion splicing. The optical fiber protection structure 20 serves to protect the optical fibers 11 and 12 and the fusion splice portion 19 from external forces, impact, and vibration.

Figure 6:
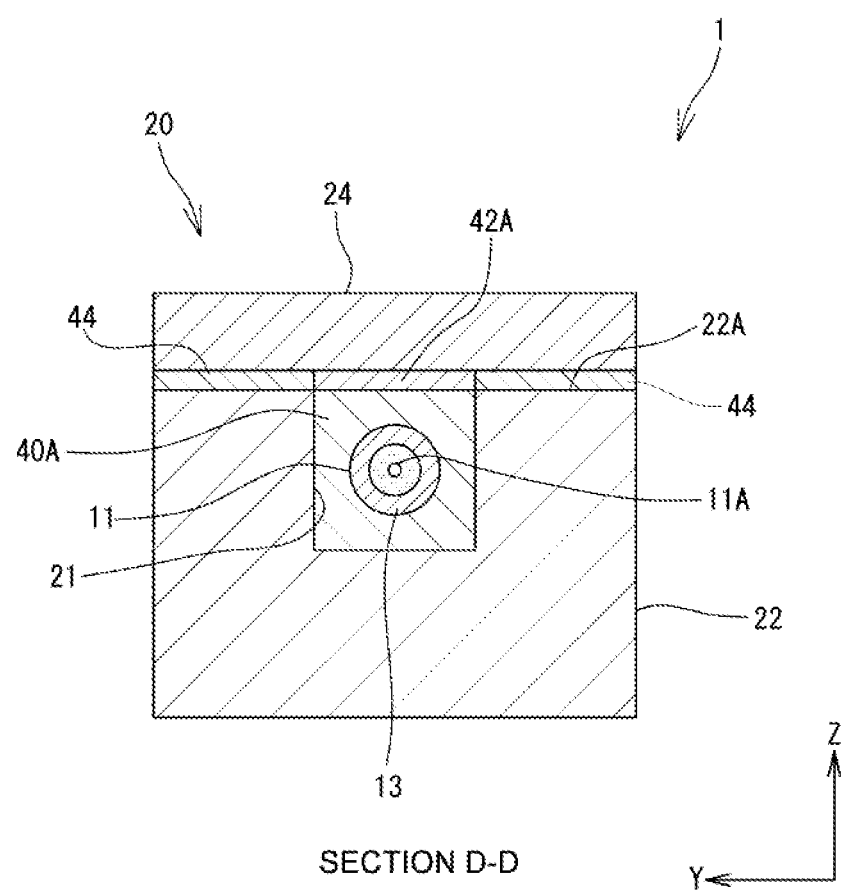
FIG. 6 is a cross-sectional view taken along line D-D of FIG. 5.
Figure 7:
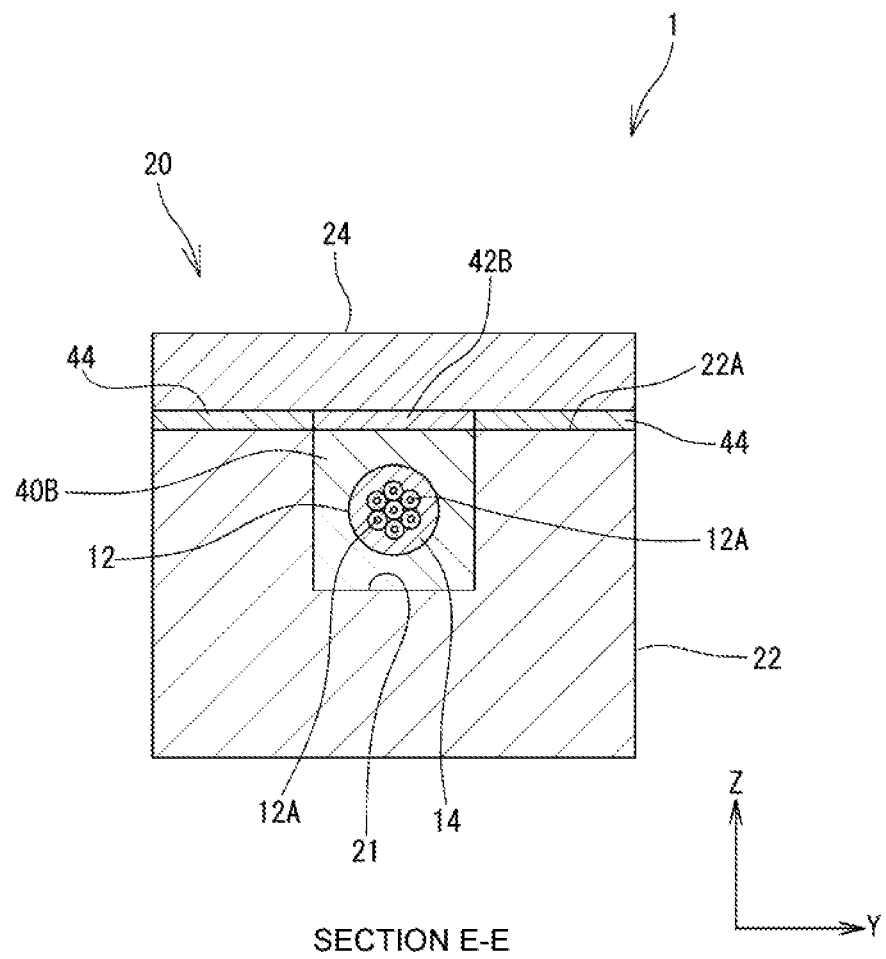
FIG. 7 is a cross-sectional view taken along line E-E of FIG. 5.
Figure 8:
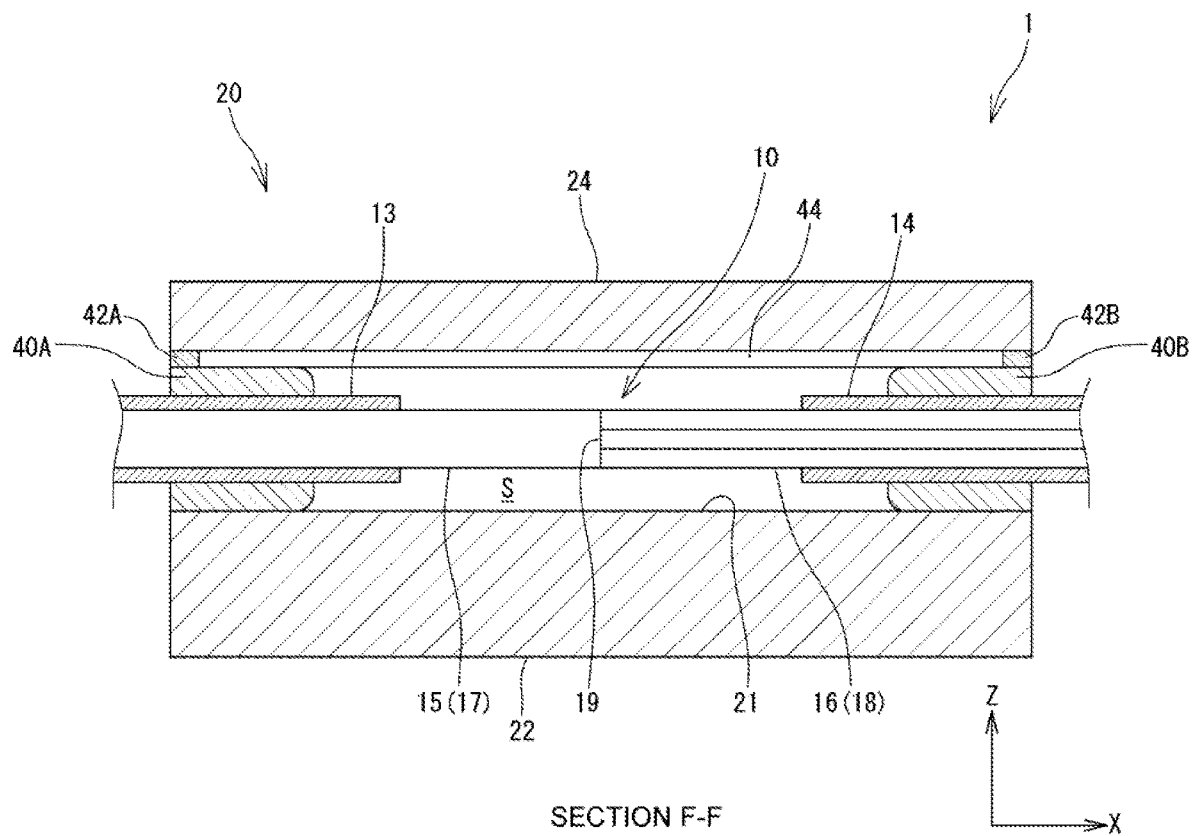
FIG. 8 is a cross-sectional view taken along line F-F of FIG. 5.

FIG. 6 is a cross-sectional view taken along line D-D of FIG. 5, FIG. 7 is a cross-sectional view taken along line E-E of FIG. 5, and FIG. 8 is a cross-sectional view taken along line F-F of FIG. 5. The optical fiber protection structure 20 has a fiber accommodation portion 22 having an upper surface 22A in which a fiber accommodation groove 21 is formed along the X-direction and a cover member 24 disposed on the fiber accommodation portion 22. The fiber accommodation portion 22 has a shape of a generally rectangular parallelepiped with a longitudinal direction along the X-direction. The cover member 24 is configured to have substantially the same dimension as the fiber accommodation portion 22 in the plan view.

As shown in FIGS. 5 and 8, a covering 13 of the first optical fiber 11 is removed over a predetermined distance from an end of the first optical fiber 11. Thus, a bare fiber exposure portion 17 in which a bare fiber 15 is exposed is formed. Furthermore, a covering 14 of the second optical fiber 12 is removed over a predetermined distance from an end of the second optical fiber 12. Thus, a bare fiber exposure portion 18 in which a bare fiber 16 is exposed is formed. The bare fiber exposure portion 17 of the first optical fiber 11 and the bare fiber exposure portion 18 of the second optical fiber 12 are connected to each other at the fusion splice portion 19 by fusion splicing.

The bare fiber exposure portion 17 of the first optical fiber 11 and the bare fiber exposure portion 18 of the second optical fiber 12 are disposed within the fiber accommodation groove 21 of the fiber accommodation portion 22 in a state in which the bare fiber exposure portion 17 and the bare fiber exposure portion 18 are connected to each other at the fusion splice portion 19 by fusion splicing. Since the fiber accommodation groove 21 of the fiber accommodation portion 22 is covered with the cover member 24, the fusion splice portion 19 and the bare fiber exposure portions 17 and 18 are surrounded by the fiber accommodation portion 22 and the cover member 24 and are thus protected from external forces, impact, and vibration. For example, the fiber accommodation portion 22 and the cover member 24 may be formed of a glass material such as Neoceram (trademark) or quartz.

In the present embodiment, the first optical fiber 11 is formed by a single fiber having a core 11A (see FIG. 6), and the second optical fiber 12 is formed by a bundle fiber into which a plurality of optical fibers (seven optical fibers in the illustrated example) each having a core 12A are bundled (see FIG. 7). Thus, the optical combiner 10 of the present embodiment is formed as a 7×1 optical combiner. As a matter of course, the number of the core 11A of the first optical fiber 11 and the number of the cores 12A of the second optical fiber 12 may be changed in an appropriate manner.

As shown in FIGS. 5 and 6, the first optical fiber 11 is fixed within the fiber accommodation groove 21 by a first resin 40A, which is filled into a first end of the fiber accommodation groove 21 along the X-direction. As shown in FIG. 6, this first resin 40A surrounds the whole circumference of the covering 13 of the first optical fiber 11. Similarly, as shown in FIGS. 5 and 7, the second optical fiber 12 is fixed within the fiber accommodation groove 21 by a first resin 40B, which is filled into a second end of the fiber accommodation groove 21 along the X-direction. As shown in FIG. 7, this first resin 40B surrounds the whole circumference of the covering 14 of the second optical fiber 12.

As shown in FIGS. 5 and 6, a second resin 42A is formed between the first resin 40A and the cover member 24. This second resin 42A connects the first resin 40A and the cover member 24 to each other. Similarly, as shown in FIGS. 5 and 7, a second resin 42B is formed between the first resin 40B and the cover member 24. This second resin 42B connects the first resin 40B and the cover member 24 to each other. The second resins 42A and 42B are formed of a material having a Young's modulus lower than those of the first resins 40A and 40B.

As shown in FIGS. 5 to 7, a third resin 44 is formed between the fiber accommodation portion 22 and the cover member 24 along edges of the fiber accommodation portion 22 except for the area where the second resins 42A and 42B are formed. The fiber accommodation portion 22 and the cover member 24 are fixed to each other primarily by the third resin 44. Therefore, in the present embodiment, the third resin 44 serves as a fixation portion for fixing the cover member 24 onto the fiber accommodation portion 22. For example, a room temperature vulcanizing (RTV) resin and the like may be used for the third resin 44.

In this manner, the second resins 42A and 42B and the third resin 44 are formed all around the edges of the upper surface 22A of the fiber accommodation portion 22. The cover member 24 is placed on those resins. Therefore, the cover member 24 can be fixed in a state in which the cover member 24 is brought into intimate contact with the fiber accommodation portion 22 via the resins. Thus, a hermetically sealed space S, which is substantially hermetically sealed from an external space, can be formed within the fiber accommodation portion 22. In the present embodiment, air within the hermetically sealed space S forms an air cladding to the bare fiber exposure portions 17 and 18 of the optical fibers 11 and 12.

As described above, the bare fiber exposure portions 17 and 18 and the fusion splice portion 19 of the optical fibers 11 and 12 are received within the fiber accommodation groove 21 of the fiber accommodation portion 22 and surrounded by the fiber accommodation portion 22 and the cover member 24. Therefore, the bare fiber exposure portions 17 and 18 and the fusion splice portion 19 of the optical fibers 11 and 12, which are particularly vulnerable to external forces, are protected from external forces, impact, and vibration. Furthermore, since the bare fiber exposure portions 17 and 18 of the optical fibers 11 and 12 are disposed in the hermetically sealed space S, any foreign material such as dust is prevented from being attached to the bare fiber exposure portions 17 and 18. Accordingly, light in the optical fibers 11 and 12 is prevented from leaking into an attached foreign material to cause the burnout of the optical fibers.

Figure 9:
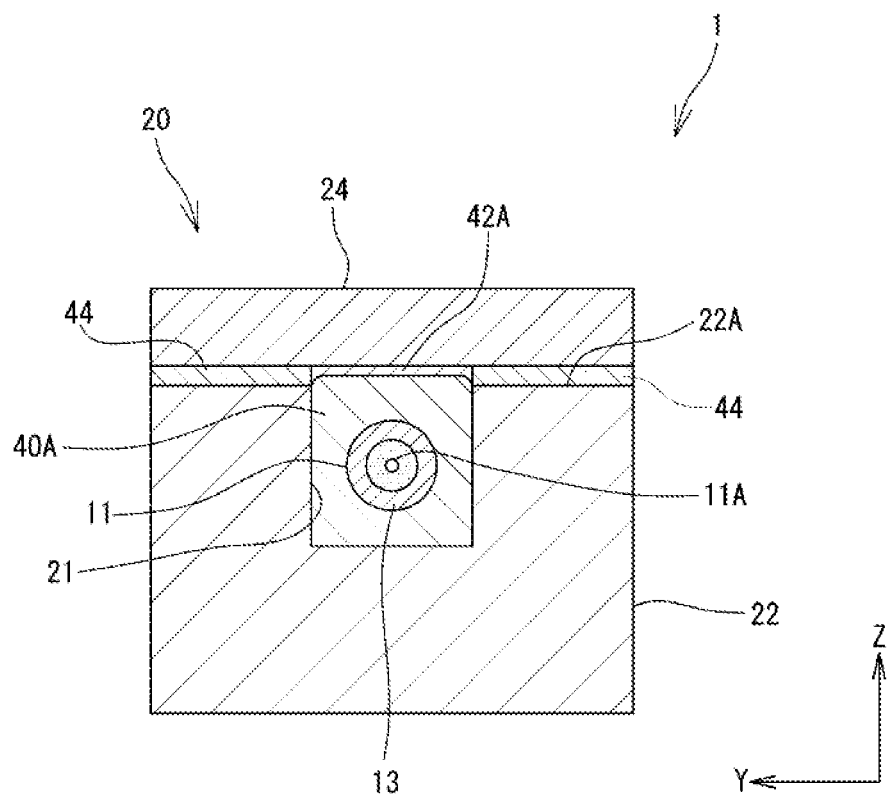
FIG. 9 is a cross-sectional view showing a state in which a first resin has expanded in the optical combiner structure shown in FIG. 6.

When the optical combiner structure 1 as configured above is under a high-temperature environment or a high-humidity environment, the first resins 40A and 40B that fix the optical fibers 11 and 12 to the fiber accommodation groove 21 expand as shown in FIG. 9. In the present embodiment, the second resins 42A and 42B, which have a Young's modulus lower than the first resins 40A and 40B (i.e., more likely to deform), are formed between the first resins 40A, 40B and the cover member 24. Therefore, even if the first resins 40A and 40B expand under a high-temperature environment or a high-humidity environment, the second resins 42A and 42B deform to allow the first resins 40A and 40B to expand toward the cover member 24. Thus, stresses applied to the optical fibers 11 and 12 by the first resins 40A and 40B is reduced to suppress an increase of the optical loss of the optical fibers 11 and 12. In this manner, the second resins 42A and 42B of the present embodiment serve as a stress reduction portion for allowing the first resins 40A and 40B to expand toward the cover member 24 to reduce stresses applied to the optical fibers 11 and 12.

In this case, the third resin 44, which serves as a fixation portion for fixing the cover member 24 onto the fiber accommodation portion 22, may preferably have a Young's modulus that is higher than the Young's modulus of the second resins 42A and 42B. When the cover member 24 is fixed onto the fiber accommodation portion 22 by the third resin 44 having a Young's modulus higher than the Young's modulus of the second resins 42A and 42B, stresses applied to the optical fibers 11 and 12 can be reduced by the second resins 42A and 42B having a lower Young's modulus (more likely to deform) while the cover member 24 can firmly be fixed onto the fiber accommodation portion 22 by the third resin having a higher Young's modulus (less likely to deform).

In the present embodiment, the first resins 40A, 40B and the second resins 42A, 42B are formed on both ends of the fiber accommodation groove 21. Nevertheless, the first resins 40A, 40B and the second resins 42A, 42B may be formed at positions deviated from both ends of the fiber accommodation groove 21 toward the center of the fiber accommodation groove 21 in the X-direction. The number of locations where the first resins 40A, 40B and the second resins 42A, 42B are formed is not limited two and may be one, or otherwise three or more.

Figure 10:
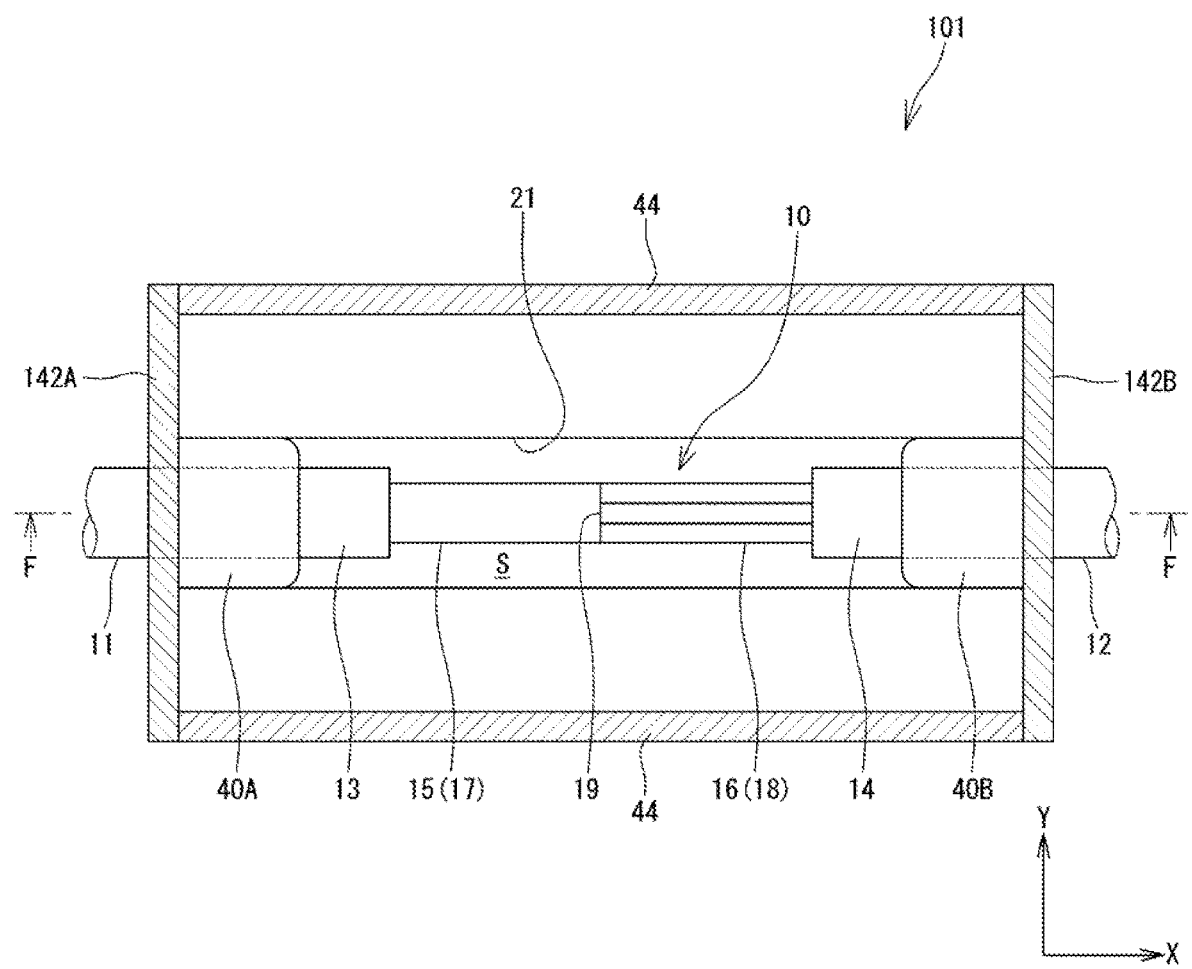
FIG. 10 is a cross-sectional view showing an optical combiner structure according to a second embodiment of the present invention and corresponds to the cross-sectional view of FIG. 5.
Figure 11:
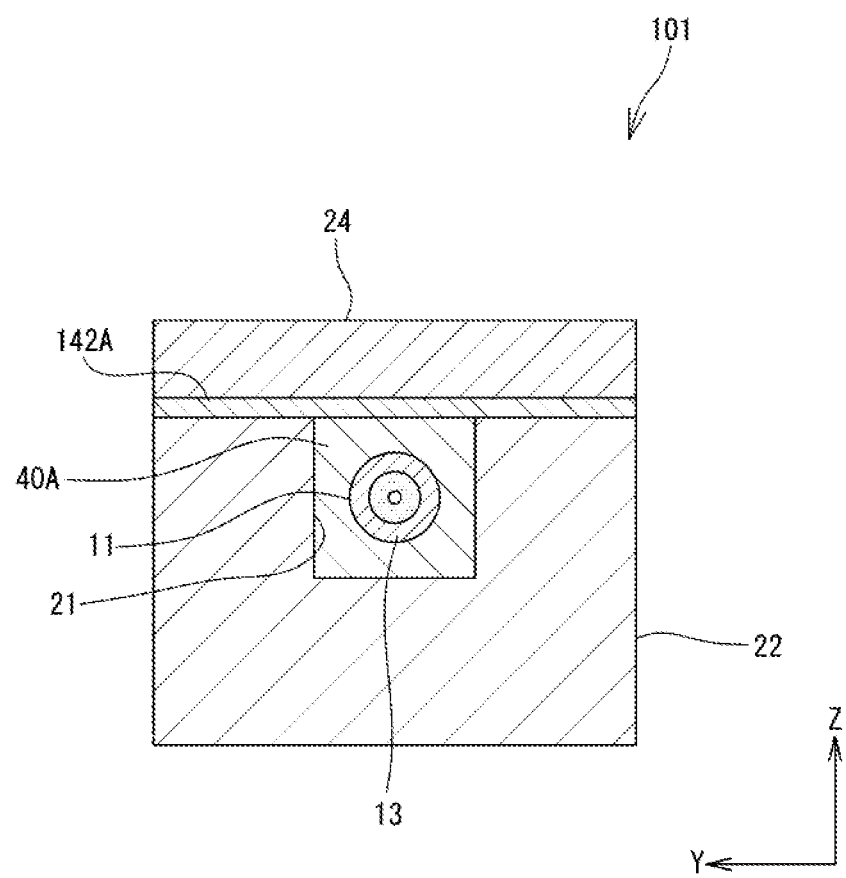
FIG. 11 is a cross-sectional view showing an optical combiner structure according to the second embodiment of the present invention and corresponds to the cross-sectional view of FIG. 6.

FIGS. 10 and 11 are cross-sectional views showing an optical combiner structure 101 according to a second embodiment of the present invention. FIG. 10 corresponds to the cross-sectional view of FIG. 5, and FIG. 11 corresponds to the cross-sectional view of FIG. 6. In the aforementioned first embodiment, the width of the second resins 42A and 42B as measured along the Y-direction is substantially the same as the width of the first resins 40A and 40B as measured along the Y-direction. In the second embodiment, however, the width of the second resins 142A and 142B as measured along the Y-direction is greater than the width of the first resins 40A and 40B as measured along the Y-direction. In the illustrated example, the second resins 142A and 142B are formed over the overall width of the fiber accommodation portion 22 along the Y-direction. With such a configuration, the area of the second resins 142A and 142B that allow expansion of the first resins 40A and 40B is increased as compared to the first embodiment. Therefore, stresses applied to the optical fibers 11 and 12 can more effectively be reduced.

Figure 12:
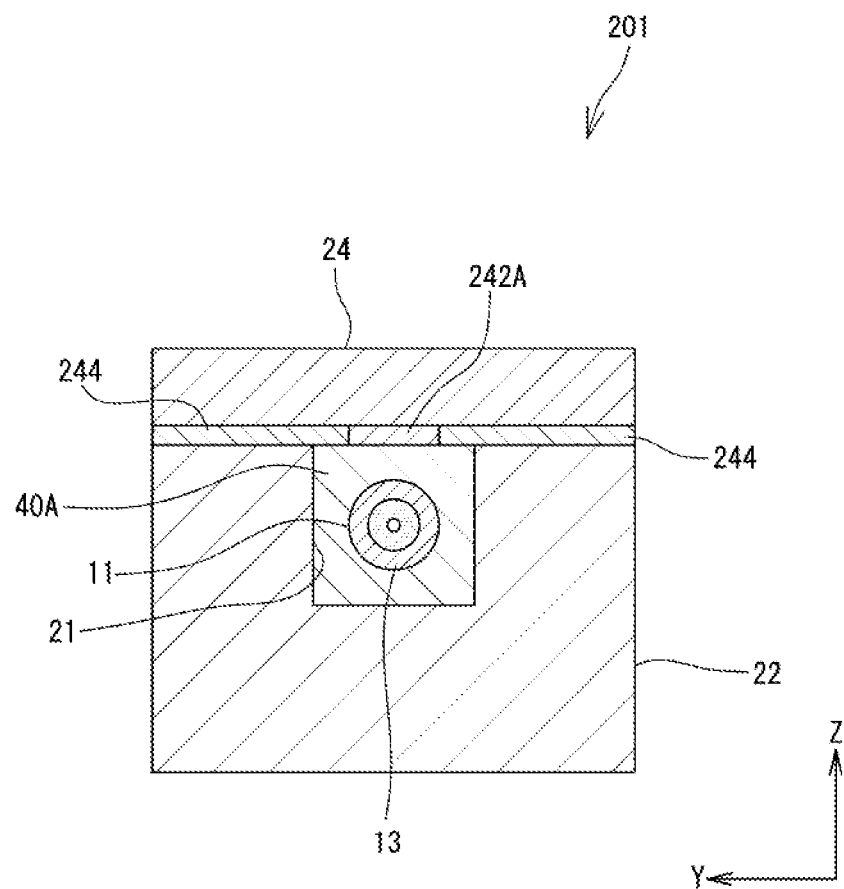
FIG. 12 is a cross-sectional view showing an optical combiner structure according to a third embodiment of the present invention and corresponds to the cross-sectional view of FIG. 6.

FIG. 12 is a diagram showing an optical combiner structure 201 according to a third embodiment of the present invention and corresponds to the cross-sectional view of FIG. 6. In contrast to the second embodiment, the width of the second resins 242A and 242B as measured along the Y-direction is less than the width of the first resins 40A and 40B as measured along the Y-direction in the present embodiment. With this configuration, the area of the third resin 244 that fixes the fiber accommodation portion 22 and the cover member 24 to each other is increased as compared to the first embodiment. Therefore, the fiber accommodation portion 22 and the cover member 24 can more firmly be fixed to each other.

Figure 13:
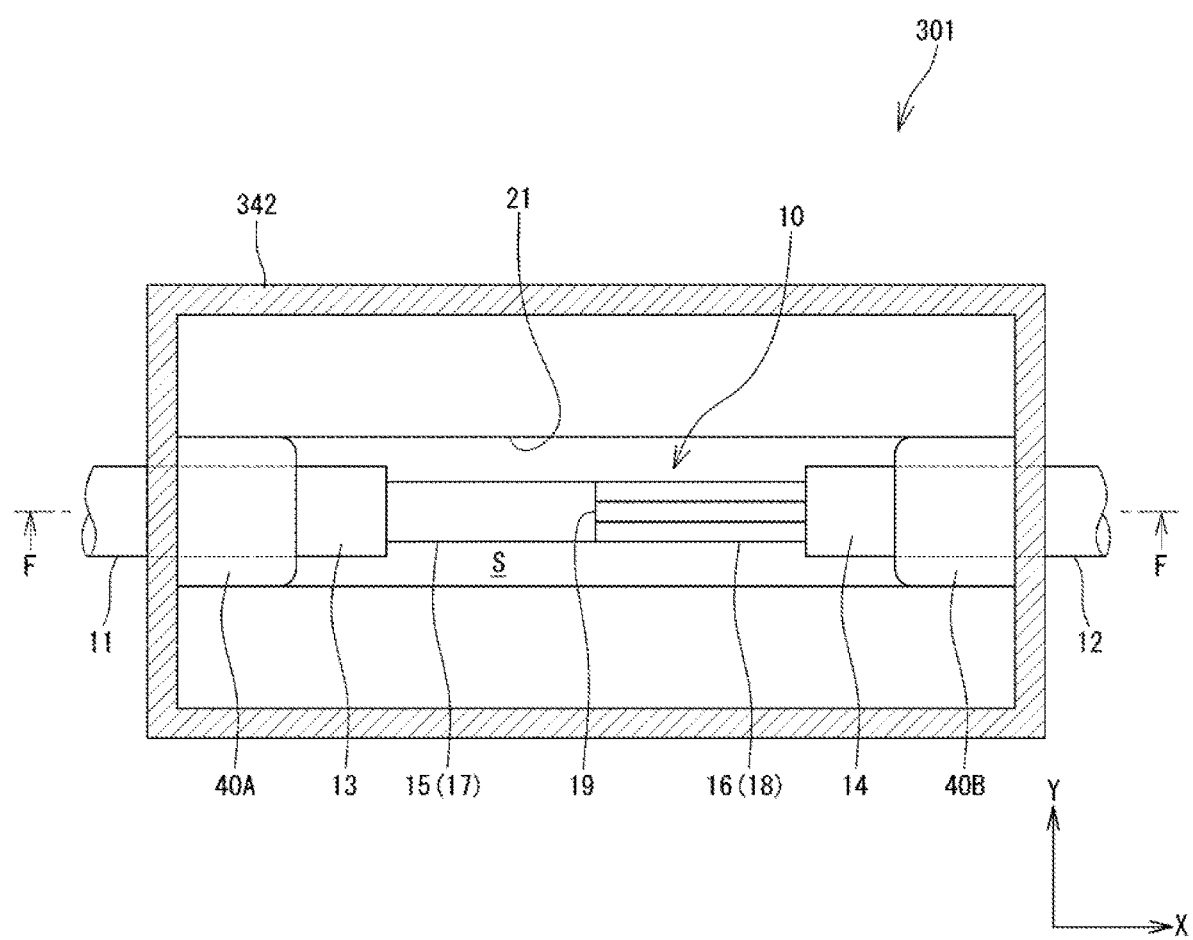
FIG. 13 is a cross-sectional view showing an optical combiner structure according to a fourth embodiment of the present and corresponds to the cross-sectional view of FIG. 5.
Figure 14:
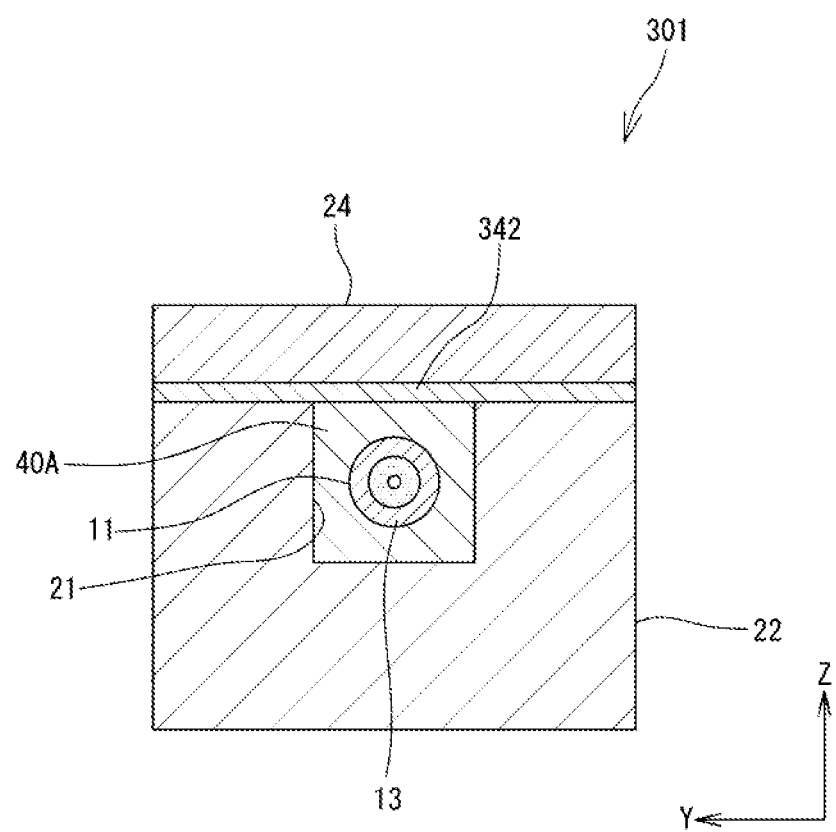
FIG. 14 is a cross-sectional view showing the optical combiner structure according to the fourth embodiment of the present and corresponds to the cross-sectional view of FIG. 6.

FIGS. 13 and 14 are cross-sectional views showing an optical combiner structure 301 according to a fourth embodiment of the present invention. FIG. 13 corresponds to the cross-sectional view of FIG. 5, and FIG. 14 corresponds to the cross-sectional view of FIG. 6. As shown in FIGS. 13 and 14, in the present embodiment, a second resin 342 formed of a material having a Young's modulus lower than those of the first resins 40A and 40B is provided between the first resins 40A, 40B and the cover member 24. The second resin 342 is formed not only between the first resins 40A, 40B and the cover member 24, but also along the edges of the fiber accommodation portion 22. Thus, the second resin 342 of the present embodiment serves not only as a stress reduction portion for allowing the first resins 40A and 40B to expand toward the cover member 24 to reduce stresses applied to the optical fibers 11 and 12, but also as a fixation portion for fixing the cover member 24 onto the fiber accommodation portion 22. According to the present embodiment, the stress reduction portion and the fixation portion can be implemented by the same resin. Therefore, the manufacturing process can be simplified, and the manufacturing cost can also be reduced.

Figure 15:
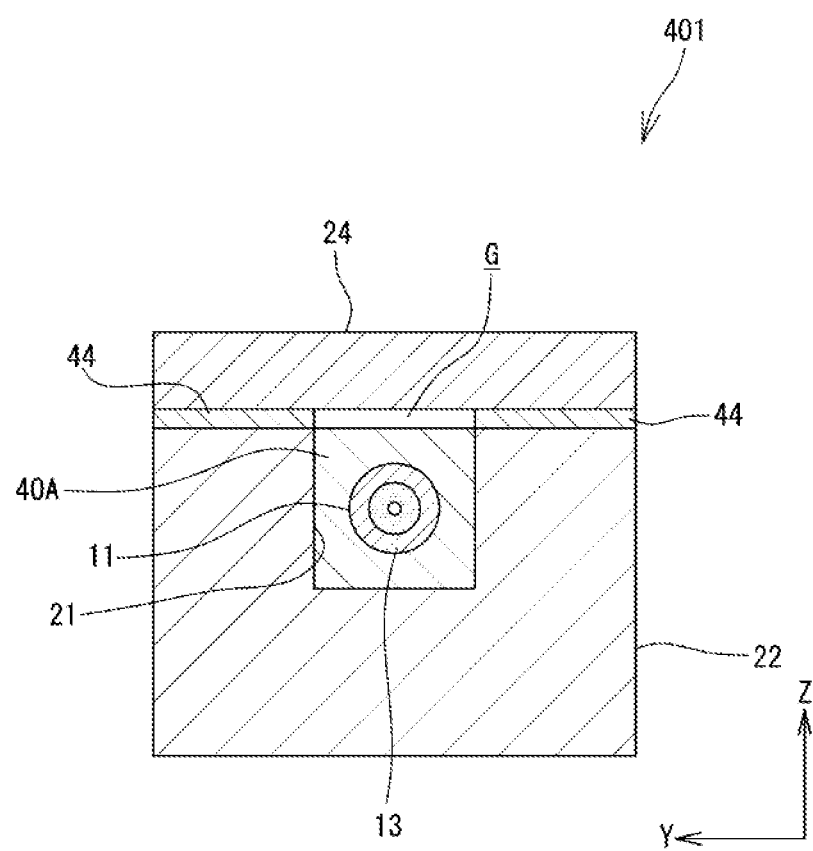
FIG. 15 is a cross-sectional view showing an optical combiner structure according to a fifth embodiment of the present invention and corresponds to the cross-sectional view of FIG. 5.
Figure 16:
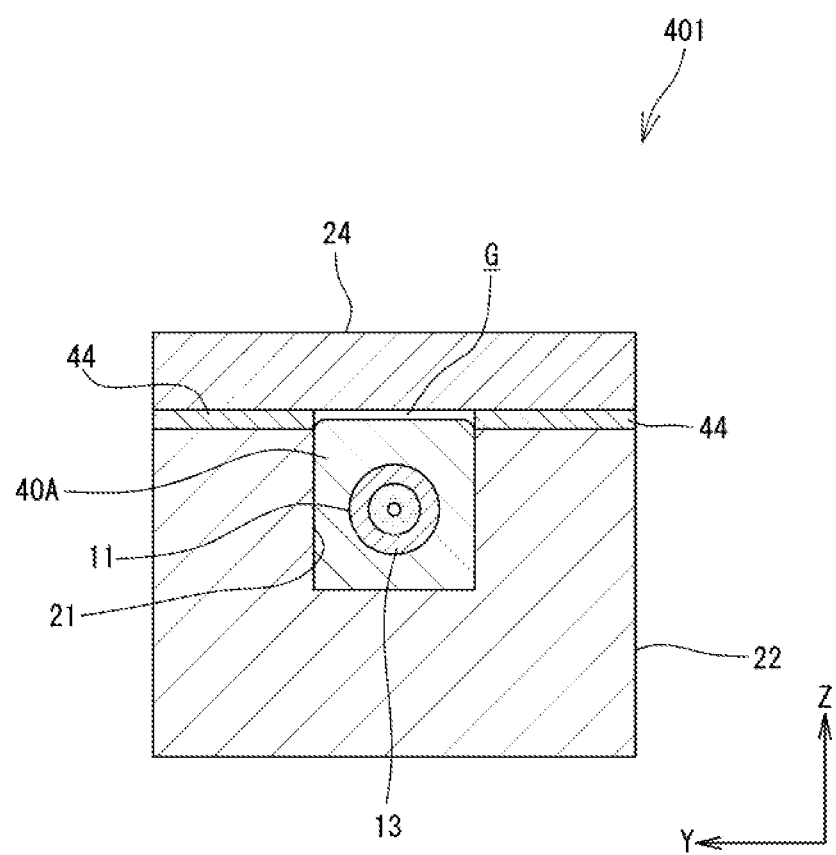
FIG. 16 is a cross-sectional view showing a state in which a first resin has expanded in the optical combiner structure shown in FIG. 15.

FIG. 15 is a cross-sectional view showing an optical combiner structure 401 according to a fifth embodiment of the present invention and corresponds to the cross-sectional view of FIG. 6. As shown in FIG. 15, according to the present embodiment, a gap G is formed between the first resin 40A and the cover member 24. If the optical combiner structure 401 thus configured is under a high-temperature environment or a high-humidity environment, the first resin 40A expands as shown in FIG. 16. Since the gap G is formed between the first resin 40A and the cover member 24, the first resin 40A is allowed to expand toward the cover member 24. Accordingly, stresses applied to the optical fiber 11 by the first resin 40A is reduced to suppress an increase of the optical loss of the optical fiber 11. In other words, the gap G formed between the first resin 40A and the cover member 24 of the present embodiment serves as a stress reduction portion for allowing the first resin 40A to expand toward the cover member 24 to reduce stresses applied to the optical fiber 11.

Figure 17:
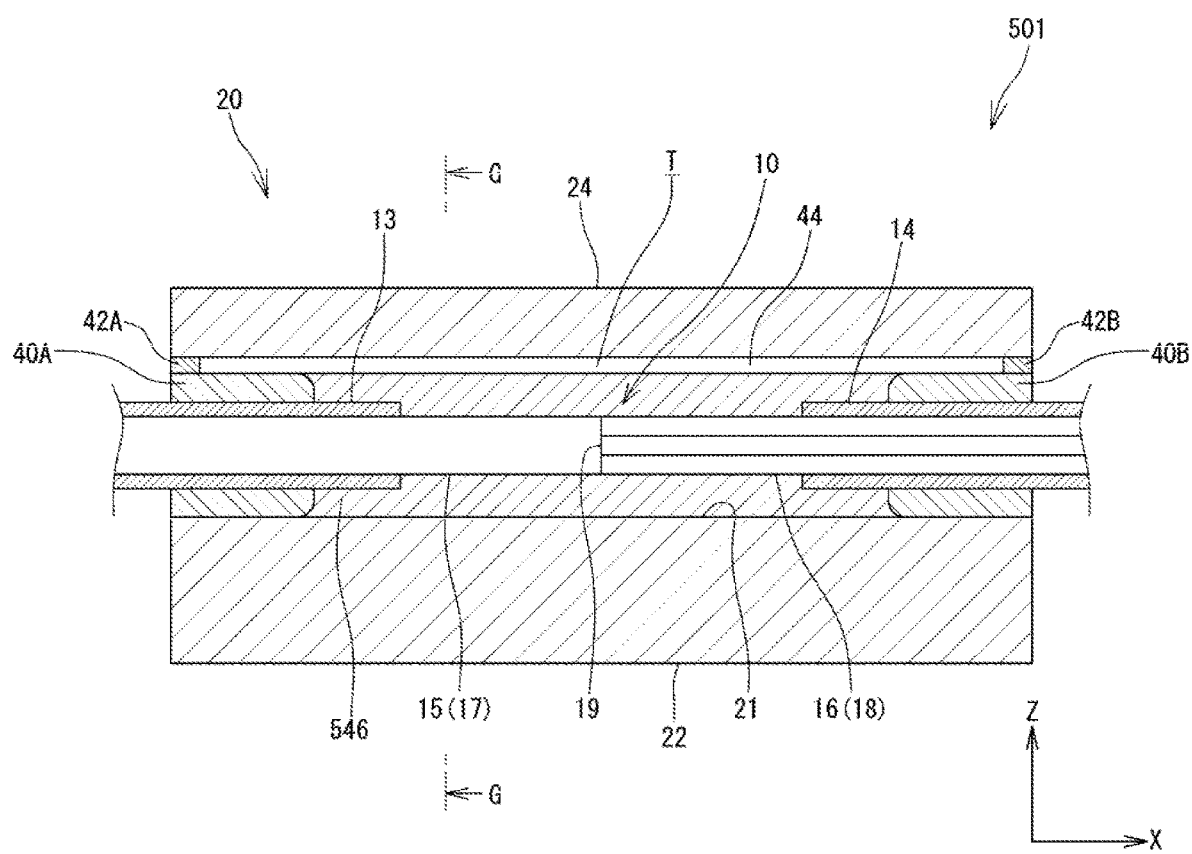
FIG. 17 is a cross-sectional view showing an optical combiner structure according to a sixth embodiment of the present invention and corresponds to the cross-sectional view of FIG. 8.
Figure 18:
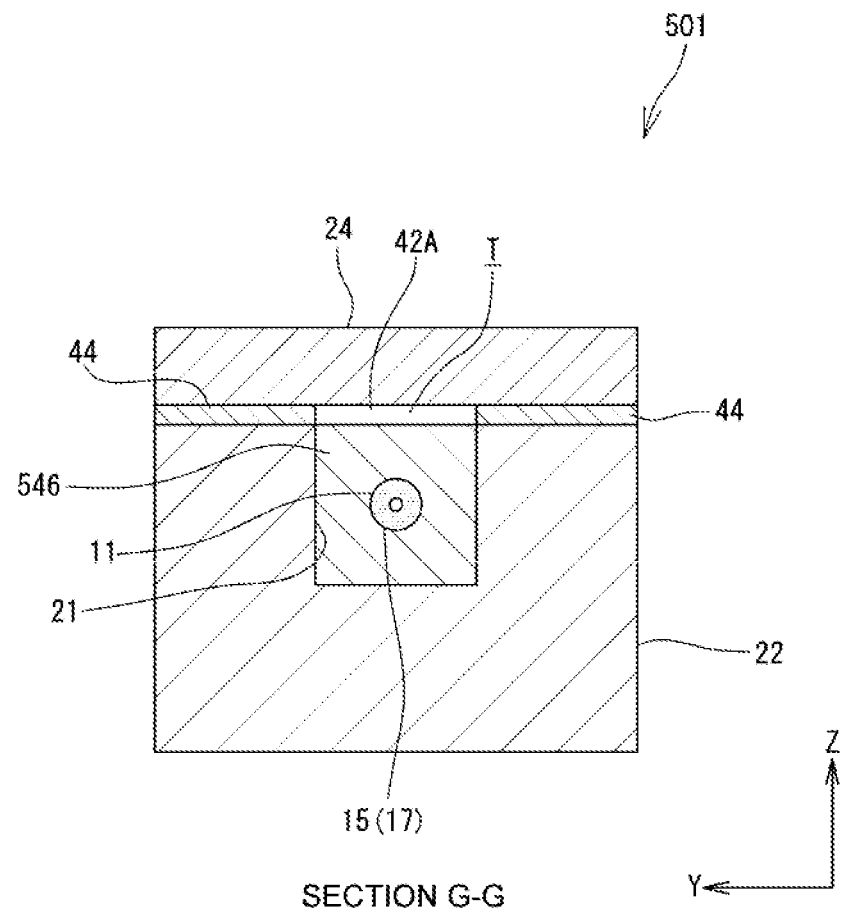
FIG. 18 is a cross-sectional view taken along line G-G of FIG. 17.

FIG. 17 is a cross-sectional view showing an optical combiner structure 501 according to a sixth embodiment of the present invention and corresponding to the cross-sectional view of FIG. 8. FIG. 18 is a cross-sectional view taken along line G-G of FIG. 17. In the aforementioned first to fifth embodiments, an air cladding is formed by the air within the hermetically sealed space S in order to prevent light from leaking out of the bare fiber exposure portions 17 and 18. In the present embodiment, however, the hermetically sealed space S is filled with a resin.

As shown in FIG. 17, first resins 40A and 40B are formed on both ends of the fiber accommodation groove 21 of the optical combiner structure 501 in the X-direction. As with the first embodiment, the second resins 42A and 42B are formed between the first resins 40A, 40B and the cover member 24. As shown in FIGS. 17 and 18, in the fiber accommodation groove 21, a fourth resin 546 is formed so as to surround the whole circumferences of the optical fibers 11 and 12 except portions where the first resins 40A and 40B are formed. The fourth resin 546 is formed of a material having a refractive index lower than those of the claddings of the bare fibers 15 and 16. A gap T is formed between the fourth resin 546 and the cover member 24.

In this manner, the optical fibers 11 and 12 within the optical combiner structure 501 are covered with the fourth resin 546 having a refractive index lower than those of the claddings of the bare fibers 15 and 16. Therefore, light propagating through the bare fiber exposure portions 17 and 18 is prevented from leaking out of the bare fiber exposure portions 17 and 18. Furthermore, the gap T is formed between the fourth resin 546 and the cover member 24. Accordingly, even if the fourth resin 546 expands under a high-temperature environment or a high-humidity environment, the gap T allows the fourth resin 546 to expand toward the cover member 24 to thereby reduce stresses applied to the optical fibers 11 and 12. In other words, the gap T serves as a stress reduction portion for allowing the fourth resin 546 to expand toward the cover member 24 to reduce stresses applied to the optical fibers 11 and 12. Therefore, an increase of the optical loss of the optical fibers 11 and 12 is suppressed under a high-temperature environment or a high-humidity environment.

Instead of the gap T or in addition to the gap T, a fifth resin (not shown) having a Young's modulus lower than that of the fourth resin 546 may be formed as a stress reduction portion between the fourth resin 546 and the cover member 24. When the Young's modulus of the second resins 42A and 42B is lower than the Young's modulus of the fourth resin, the second resins 42A and 42B may be used as the fifth resin.

Furthermore, the fourth resin 546 may be formed of a material having a refractive index lower than those of the coverings 13 and 14 in order to reduce the leakage of light from the coverings 13 and 14. Additionally, the first resins 40A, 40B and the fourth resin 546 may be formed of the same material in order to suppress an increase of the manufacturing costs. Moreover, the fourth resin 546 may be provided so as to cover only a portion of the bare fiber exposure portions 17 and 18.

Furthermore, in the aforementioned sixth embodiment, the fourth resin 546 is formed of a material having a refractive index lower than those of the claddings of the bare fibers 15 and 16. In a case where optical fibers each having a core and at least one cladding are connected to each other, however, the fourth resin may be formed of a material having a refractive index higher than those of the claddings and disposed near the fusion splice portion 19. With such a configuration, unnecessary light propagating through the claddings of the optical fibers 11 and 12 can be removed while the influence of heat generated by such unnecessary light on the optical fibers 11 and 12 can be reduced.

In the aforementioned embodiments, the fiber accommodation portion 22 and the cover member 24 have the same dimension in the plan view, and the cover member 24 is disposed on the fiber accommodation portion 22 so as to cover the overall length of the fiber accommodation groove 21. However, the cover member 24 may not cover the overall length of the fiber accommodation groove 21. Thus, the cover member 24 may be configured to cover at least a portion of the fiber accommodation groove 21.

In the aforementioned embodiments, a resin is used as the fixation portion for fixing the cover member 24 onto the fiber accommodation portion 22. However, various ways are possible to implement such a fixation portion. For example, a mechanical means such as a bolt may be used to fix the fiber accommodation portion 22 and the cover member 24 to each other. A magnetic force may be used to fix the fiber accommodation portion 22 and the cover member 24 to each other. Alternatively, the weight of the cover member 24 may be made greater than the weight of the fiber accommodation portion 22 so that a large frictional force is applied between the fiber accommodation portion 22 and the cover member 24.

Moreover, the aforementioned embodiments have described examples of an optical combiner structure using an optical fiber protection structure according to the present invention. As a matter of course, however, an optical fiber protection structure according to the present invention is applicable to any optical element other than an optical combiner.

EXAMPLES

The inventors carried out the following experiments in order to examine the performance of an optical fiber protection structure according to the present invention. Specifically, an optical fiber protection structure as shown in FIGS. 10 and 11 was used for an example of an optical fiber protection structure according to the present invention. The optical fiber structure was placed at temperatures from 25° C. to 70° C. The light transmittance of the optical fibers was measured. Furthermore, for a comparative example, the same experiment was carried out with an RTV resin having a Young's modulus higher than the Young's modulus of the first resin 40A instead of the second resin 342 in the optical fiber protection structure shown in FIGS. 13 and 14, and the light transmittance of the optical fibers was measured.

Figure 19:
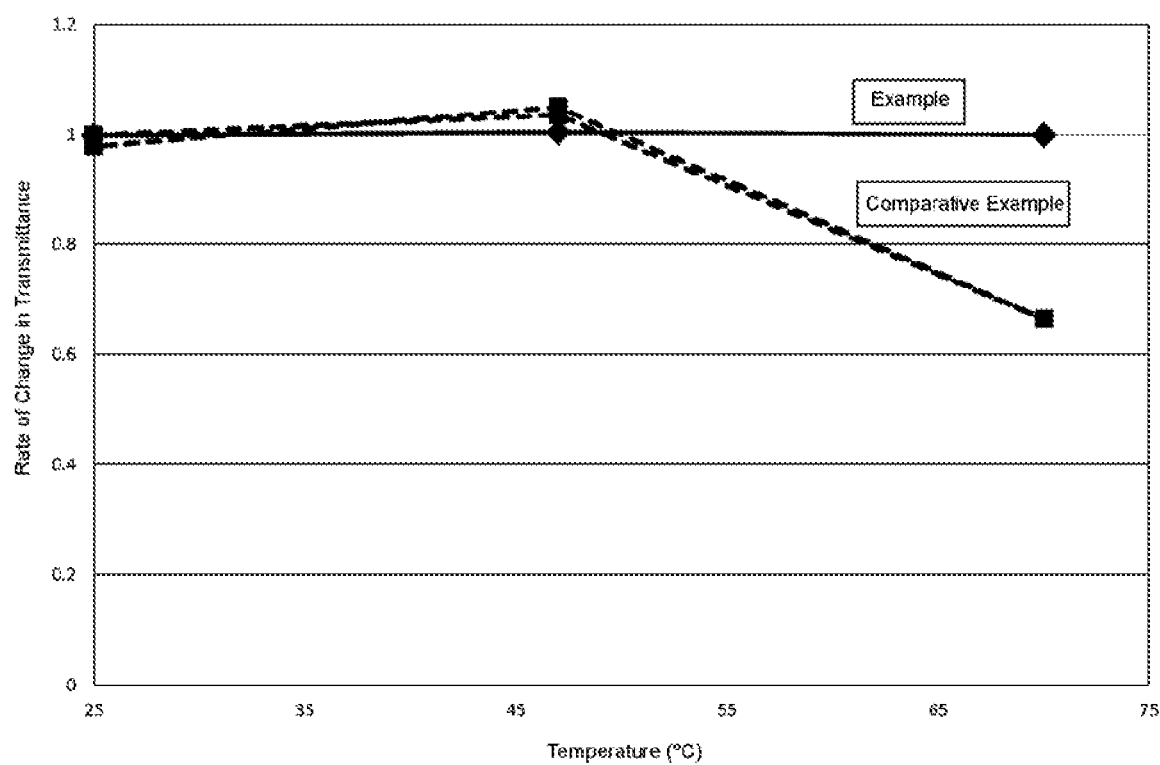
FIG. 19 is a graph showing the relationship between the temperature and a rate of change in light transmittance for Example of an optical fiber protection structure according to the present invention and Comparative Example.

FIG. 19 is a graph showing a rate of change in light transmittance at varied temperatures while the light transmittance at 25° C. is defined as 1. In FIG. 19, the light transmittance for the example of the optical fiber protection structure according to the present invention is indicated by a solid line whereas the light transmittance for the comparative example is indicated by a dashed line. As shown in FIG. 19, in the example of the optical fiber protection structure according to the present invention, the light transmittance hardly changed for the temperature variation from 25° C. to 70° C. With regard to the comparative example, it can be seen that the light transmittance significantly decreased at 70° C. This reveals that the light transmittance is less likely to decrease under a high-temperature environment in the optical fiber protection structure according to the present invention as compared to the optical fiber protection structure of the comparative example.

Although some preferred embodiments of the present invention have been described, the present invention is not limited to the aforementioned embodiments. It should be understood that various different forms may be applied to the present invention within the technical idea thereof. The terms "down," "up," "upper," "lower," "left," "right," "leftward," and "rightward," and other positional terms described herein are used in connection with the illustrated embodiments and may be varied depending on the relative positional relationship between components of the apparatus.

INDUSTRIAL APPLICABILITY

The present invention is suitably used for an optical combiner having an optical fiber protection structure that accommodates at least a portion of an optical fiber therein.

DESCRIPTION OF REFERENCE NUMERALS AND SIGNS

1 Optical combiner structure
10 Optical combiner
11 First optical fiber
12 Second optical fiber
13, 14 Covering
15, 16 Bare fiber
17, 18 Bare fiber exposure portion
19 Fusion splice portion
20 Optical fiber protection structure
21 Fiber accommodation groove
22 Fiber accommodation portion
24 Cover member
40A, 40B First resin
42A, 42B Second resin
44 Third resin
101 Optical combiner structure
142A, 142B Second resin
201 Optical combiner structure
242A, 242B Second resin
244 Third resin
301 Optical combiner structure
342 Second resin
401 Optical combiner structure
G Gap

The invention claimed is:

1. An optical fiber protection structure comprising:
a fiber accommodation portion having a fiber accommodation groove formed therein for accommodating at least a portion of at least one optical fiber;
a first resin filled in the fiber accommodation groove for fixing the at least a portion of the at least one optical fiber within the fiber accommodation groove, the at least the portion of the at least one optical fiber being surrounded by the first resin in a cross section;
a cover member disposed above the fiber accommodation portion so as to cover at least a portion of the fiber accommodation groove;
a fixation portion for fixing the cover member above the fiber accommodation portion; and
a first stress reduction portion for allowing the first resin to expand toward the cover member to reduce a stress applied to the at least one optical fiber,
wherein the first stress reduction portion is formed by a second resin formed between the first resin and the cover member, the second resin having a Young's modulus lower than that of the first resin.

2. The optical fiber protection structure as recited in claim 1, wherein the fixation portion is formed by a third resin formed between an upper surface of the fiber accommodation portion and the cover member, the third resin having a Young's modulus higher than that of the second resin.

3. The optical fiber protection structure as recited in claim 1, wherein the fixation portion is formed by a third resin formed between an upper surface of the fiber accommodation portion and the cover member.

4. The optical fiber protection structure as recited in claim 1, wherein the fixation portion is formed by the second resin formed between an upper surface of the fiber accommodation portion and the cover member.

5. The optical fiber protection structure as recited in claim 1, further comprising:
a fourth resin provided within the fiber accommodation groove so as to cover at least a portion of the at least one optical fiber within the fiber accommodation groove; and
a second stress reduction portion for allowing the fourth resin to expand toward the cover member to reduce a stress applied to the at least one optical fiber.

6. The optical fiber protection structure as recited in claim 5, wherein the fourth resin is formed of a material having a refractive index lower than that of a cladding of the optical fiber.

7. The optical fiber protection structure as recited in claim 5, wherein the fourth resin is formed of a material having a refractive index higher than that of a cladding of the optical fiber.

8. The optical fiber protection structure as recited in claim 5, wherein the second stress reduction portion is formed by a fifth resin formed between the fourth resin and the cover member, the fifth resin having a Young's modulus lower than that of the fourth resin.

9. The optical fiber protection structure as recited in claim 5, wherein the second stress reduction portion is formed by a gap defined between the fourth resin and the cover member.

10. An optical combiner structure comprising:
an optical fiber protection structure as recited in claim 1; and
an optical combiner including a first optical fiber, a second optical fiber, and a fusion splice portion in which the first optical fiber and the second optical fiber are connected to each other by fusion splicing,
wherein at least a portion of the first optical fiber, at least a portion of the second optical fiber, and the fusion splice portion are received within the fiber accommodation groove of the fiber accommodation portion in the optical fiber protection structure.

11. The optical combiner structure as recited in claim 10, wherein the fixation portion of the optical fiber protection structure is formed by a third resin formed between an upper surface of the fiber accommodation portion and the cover member, the third resin having a Young's modulus higher than that of the second resin.

12. The optical combiner structure as recited in claim 10, wherein the fixation portion of the optical fiber protection structure is formed by a third resin formed between an upper surface of the fiber accommodation portion and the cover member.

13. The optical combiner structure as recited in claim 10, wherein the optical fiber protection structure further comprises:
a fourth resin provided within the fiber accommodation groove so as to cover at least a portion of the at least one optical fiber within the fiber accommodation groove; and
a second stress reduction portion for allowing the fourth resin to expand toward the cover member to reduce a stress applied to the at least one optical fiber.

14. The optical combiner structure as recited in claim 13, wherein the second stress reduction portion of the optical fiber protection structure is formed by a fifth resin formed between the fourth resin and the cover member, the fifth resin having a Young's modulus lower than that of the fourth resin.

15. The optical combiner structure as recited in claim 13, wherein the second stress reduction portion of the optical fiber protection structure is formed by a gap defined between the fourth resin and the cover member.

16. The optical fiber protection structure as recited in claim 1, wherein the first stress reduction portion has a width greater than a width of the first resin in the cross section.

* * * * *